United States Patent
Goecke

(10) Patent No.: US 10,738,220 B2
(45) Date of Patent: *Aug. 11, 2020

(54) ADHESIVE TAPE PRODUCTS AND METHODS OF MAKING

(71) Applicant: ShieldMark Inc., Rocky River, OH (US)

(72) Inventor: Thomas R. Goecke, Rocky River, OH (US)

(73) Assignee: ShieldMark, Inc., Rocky River, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/731,618

(22) Filed: Dec. 31, 2012

(65) Prior Publication Data

US 2013/0122231 A1    May 16, 2013

Related U.S. Application Data

(63) Continuation of application No. 13/342,528, filed on Jan. 3, 2012, now Pat. No. 8,343,292, which is a continuation of application No. 10/674,108, filed on Sep. 29, 2003, now Pat. No. 8,088,480.

(51) Int. Cl.
    *C09J 7/24*     (2018.01)
    *C09J 7/22*     (2018.01)

(52) U.S. Cl.
    CPC .............. *C09J 7/245* (2018.01); *C09J 7/22* (2018.01); *C09J 2427/006* (2013.01); *Y10S 428/906* (2013.01); *Y10T 428/14* (2015.01); *Y10T 428/24355* (2015.01); *Y10T 428/26* (2015.01); *Y10T 428/266* (2015.01); *Y10T 428/28* (2015.01); *Y10T 428/2848* (2015.01)

(58) Field of Classification Search
CPC .. C09J 7/0264; C09J 7/0278; C09J 2427/006; Y10S 428/906; Y10T 428/14; Y10T 428/2848; Y10T 428/24355; Y10T 428/28; Y10T 428/26; Y10T 428/266
USPC ...................... 428/40.1, 41.7, 41.8
See application file for complete search history.

(56) References Cited

U.S. PATENT DOCUMENTS

| | | |
|---|---|---|
| 2,231,780 A | 2/1941 | Swenson |
| 3,052,917 A | 9/1962 | Horn |
| 3,399,607 A | 9/1968 | Eigenmann |
| 3,506,528 A | 4/1970 | Dean |

(Continued)

FOREIGN PATENT DOCUMENTS

| | | |
|---|---|---|
| CA | 822201 | 9/1969 |
| CH | 490574 | 5/1970 |

(Continued)

OTHER PUBLICATIONS

Polyvinyl Chloride—Wikipedia, downloaded Aug. 13, 2017 from https://en.wikipedia.org/wiki/Polyvinyl_chloride.*

(Continued)

*Primary Examiner* — Victor S Chang
(74) *Attorney, Agent, or Firm* — FisherBroyles, LLP

(57) ABSTRACT

The adhesive tape of this application comprises a layer of polymeric material, particularly a polyvinyl chloride, having a Shore A Hardness of between 92 and 100 and a layer of adhesive material attached to a surface of the layer of polymeric material.

20 Claims, 1 Drawing Sheet

(56) References Cited

U.S. PATENT DOCUMENTS

| | | | |
|---|---|---|---|
| 3,770,559 A * | 11/1973 | Jackson | C09J 7/0296 |
| | | | 428/213 |
| 3,923,726 A | 12/1975 | Benz | |
| 3,969,564 A | 7/1976 | Carder | |
| 40,589,422 | 11/1977 | Naka | |
| 4,061,805 A | 12/1977 | Thompson et al. | |
| 4,129,397 A | 12/1978 | Eigenmann | |
| 4,248,762 A | 2/1981 | Hornibrook | |
| 4,496,628 A | 1/1985 | Deatcher | |
| 4,806,400 A | 2/1989 | Sancaktar | |
| 4,892,917 A | 1/1990 | Mudge | |
| 4,998,391 A * | 3/1991 | Connew | E04F 11/166 |
| | | | 52/179 |
| 5,061,559 A | 10/1991 | Ogusi | |
| 5,102,493 A | 4/1992 | Bestgen | |
| 5,200,268 A | 4/1993 | Hamada | |
| 5,240,539 A | 8/1993 | Gunzelman | |
| 5,327,850 A | 7/1994 | Sly et al. | |
| 5,654,055 A | 8/1997 | Cox et al. | |
| 5,700,530 A | 12/1997 | Beersel | |
| 5,730,446 A | 3/1998 | Taylor | |
| 5,820,958 A | 10/1998 | Swallow | |
| 5,846,651 A | 12/1998 | Nakai et al. | |
| 5,958,525 A | 9/1999 | Green et al. | |
| 6,103,390 A | 8/2000 | Kamiya et al. | |
| 6,120,395 A | 9/2000 | Dorenbusch | |
| 6,166,145 A | 12/2000 | Guest | |
| 6,254,956 B1 | 7/2001 | Kjellqvist | |
| 6,365,658 B1 | 4/2002 | Kjellqvist | |
| 6,372,323 B1 | 4/2002 | Kobe | |
| 6,440,538 B1 | 8/2002 | Ungar | |
| 6,585,858 B1 | 7/2003 | Otto | |
| 6,855,651 B2 | 2/2005 | Yu | |
| 7,163,597 B2 | 1/2007 | Murata | |
| 7,763,337 B2 | 7/2010 | Paiva et al. | |
| 7,960,000 B2 | 6/2011 | Newman | |
| 8,088,480 B2 * | 1/2012 | Goecke | C09J 7/22 |
| | | | 428/343 |
| 2003/0077439 A1 | 4/2003 | Neubert | |
| 2004/0071961 A1 | 4/2004 | Jevons | |
| 2004/0224113 A1 | 11/2004 | Haas | |
| 2005/0142359 A1 | 6/2005 | Narum et al. | |
| 2005/0271881 A1 | 12/2005 | Hong | |
| 2007/0082195 A1 * | 4/2007 | Goecke | G09F 19/22 |
| | | | 428/343 |

FOREIGN PATENT DOCUMENTS

| | | |
|---|---|---|
| DE | 3140697 | 4/1983 |
| EP | 0354333 | 2/1990 |
| EP | 0392847 | 12/1995 |
| FR | 1082609 | 12/1954 |
| FR | 2711168 | 4/1995 |
| GB | 670107 | 4/1952 |
| GB | 692038 | 5/1953 |
| JP | 01303005 | 12/1989 |
| JP | 0287208 | 3/1990 |
| JP | 05161228 | 6/1993 |
| WO | 1989012142 | 12/1989 |
| WO | WO982813 | 7/1998 |
| WO | 2000027941 | 5/2000 |

OTHER PUBLICATIONS

Defendant's Reply to Plaintiff's Memorandum in Opposition to Defendant's Motion for Summary Judgment; *ShieldMark, Inc. v. InSite Solutions, LLC*; ND Ohio ED, 1:12-cv-00223-DCN; Sep. 28, 2012 (15 pages).

Defendant's Brief in Opposition to Plaintiff's Motion to Strike Gerrits Affidavit; *ShieldMark, Inc. v. InSite Solutions, LLC*; ND Ohio ED, 1:12-cv-00223-DCN; Sep. 28, 2012 (5 pages).

Plaintiff's Reply Supporting Motion to Strike Gerrits Affidavit; *ShieldMark, Inc. v. InSite Solutions, LLC*; ND Ohio ED, 1:12-cv-00223-DCN; Oct. 5, 2012 (4 pages).

Defendant's Opening Brief on Claim Construction; *ShieldMark, Inc. v. InSite Solutions, LLC*; ND Ohio ED, 1:12-cv-00223-DCN; Oct. 24, 2012 (124 pages).

Plaintiff's Opening Claim Construction Brief; *ShieldMark, Inc. v. InSite Solutions, LLC*; ND Ohio ED, 1:12-cv-00223-DCN; Oct. 24, 2012 (601 pages).

Defendant's Responsive Brief on Claim Construction; *ShieldMark, Inc. v. InSite Solutions, LLC*; ND Ohio ED, 1:12-cv-00223-DCN; Nov. 28, 2012 (10 pages).

Plaintiff's Responsive Brief to Defendant's Opening Brief on Claim Construction; *ShieldMark, Inc. v. InSite Solutions, LLC*: ND Ohio ED, 1:12-cv-00223-DCN; Nov. 28, 2012 (14 pages).

Joint Claim Construction and Prehearing Statement; *ShieldMark, Inc. v. InSite Solutions, LLC*; ND Ohio ED, 1:12-cv-00223-DCN; Dec. 3, 2012 (18 pages).

Memorandum Opinion and Order; *ShieldMark, Inc. v. InSite Solutions, LLC*; ND Ohio ED, 1:12-cv-00223-DCN; Jan. 9, 2013 (6 pages).

In re Control U.S. Appl. No. 90/012,670, Request for Ex Parte Reexamination dated Sep. 15, 2012 (391 pages).

In re Control U.S. Appl. No. 90/012,670, an Office Communication dated Nov. 15, 2012, granting ex parte reexamination of U.S. Pat. No. 8,088,480 (22 pages).

Defendant Creative's Revised Amended Counterclaims; *ShieldMark, Inc. v. Creative Safety Supply, LLC*; ND Ohio ED, 1:12-cv-00221-CAB; Feb. 1, 2013 (34 pages).

Plaintiff ShieldMark's Answer to Revised Amended Counterclaim; *ShieldMark, Inc. v. Creative Safety Supply, LLC*; ND Ohio ED, 1:12-cv-00221-CAB; Feb. 15, 2013 (39 pages).

Plaintiff ShieldMark's Second Amended Complaint; *ShieldMark, Inc. v. Creative Safety Supply, LLC*; ND Ohio ED, 1:12-cv-00221-CAB; Mar. 12, 2013 (26 pages).

Notice re USPTO Office Action Rejecting All Claims of Plaintiffs '480 Patent; *ShieldMark, Inc. v. Creative Safety Supply, LLC*; ND Ohio ED, 1:12-cv-00221-CAB; dated Mar. 20, 2013 (24 pages).

Defendant Creative's Answer to Second Amended Complaint; *ShieldMark, Inc. v. Creative Safety Supply, LLC*; ND Ohio ED, 1:12-cv-00221-CAB; Mar. 21, 2013 (45 pages).

Defendant Creative's Motion for Summary Judgment (New Matter Added); *ShieldMark, Inc. v. Creative Safety Supply, LLC*; ND Ohio ED, 1:12-cv-00221-CAB; Apr. 8, 2013 (296 pages).

Plaintiff ShieldMark's Answer to Creative's Counterclaims; *ShieldMark, Inc. v. Creative Safety Supply, LLC*; ND Ohio ED, 1:12-cv-00221-CAB; Apr. 11, 2013 (42 pages).

Plaintiff ShieldMark's Memorandum in Opposition to Motion for Summary Judgment; *ShieldMark, Inc. v. Creative Safety Supply, LLC*; ND Ohio ED, 1:12-cv-00221-CAB; May 8, 2013 (123 pages).

Defendant Creative's Reply Supporting its Motion for Summary Judgment; *ShieldMark, Inc. v. Creative Safety Supply, LLC*; ND Ohio ED, 1:12-cv-00221-CAB; May 29, 2013 (24 pages).

Memorandum Opinion and Order; *ShieldMark, Inc. v. InSite Solutions, LLC*; ND Ohio ED, 1:12-cv-00223-DCN; Feb. 14, 2013 (14 pages).

Defendant InSite's Supplemental Invalidity and Unenforceability Contentions; *ShieldMark, Inc. v. InSite Solutions, LLC*; ND Ohio ED, 1:12-cv-00223-DCN; Mar. 14, 2013 (2 pages).

Defendant InSite's Motion for Summary Judgment of Non-Infringement; *ShieldMark, Inc. v. InSite Solutions, LLC*; ND Ohio ED, 1:12-cv-00223-DCN; Mar. 20, 2013 (26 pages).

Plaintiff ShieldMark's Final Infringement Contentions; *ShieldMark, Inc. v. InSite Solutions, LLC*; ND Ohio ED, 1:12-cv-00223-DCN; May 1, 2013 (9 pages).

Defendant InSite's Final Non-Infringement Contentions; *ShieldMark, Inc. v. InSite Solutions, LLC*; ND Ohio ED, 1:12-cv-00223-DCN; May 14, 2013 (2 pages).

Defendant InSite's Final Invalidity and Unenforceability Contentions; *ShieldMark, Inc. v. InSite Solutions, LLC*; ND Ohio ED, 1:12-cv-00223-DCN; May 14, 2013 (3 pages).

Defendant InSite's Amended Final Invalidity and Unenforceability Contentions; *ShieldMark, Inc. v. InSite Solutions, LLC*; ND Ohio ED, 1:12-cv-00223-DCN; May 15, 2013 (3 pages).

(56) References Cited

OTHER PUBLICATIONS

Plaintiff ShieldMark's Memorandum in Opposition to InSite's Motion for Summary Judgment of Non-Infringement; *ShieldMark, Inc.* v. *InSite Solutions, LLC*; ND Ohio ED, 1:12-cv-00223-DCN; May 28, 2013 (26 pages).
Plaintiff ShieldMark's Final Validity and Enforceability Contentions; *ShieldMark, Inc.* v. *InSite Solutions, LLC*; ND Ohio ED, 1:12-cv-00223-DCN; May 31, 2013 (5 pages).
Complaint for Patent Infringement; *ShieldMark, Inc.* v. *InSite Solutions, LLC*; ND Ohio ED, 1:13-cv-00572; Mar. 15, 2013 (5 pages).
Defendant InSite's Answer, Affirmative Defenses and Counterclaims; *ShieldMark, Inc.* v. *InSite Solutions, LLC*; ND Ohio ED, 1:13-cv-00572; May 24, 2013 (8 pages).
Amendment and Patent Owner's Response to Office Action filed in Application No. 90012670; dated May 8, 2013 (42 pages).
Reexamination Certificate Issued in Application No. 90012670; dated Dec. 3, 2013 (2 pages).
Notice of Intent to Issue a Reexam Certificate in Application 90012670; dated Nov. 6, 2013 (10 pages).
Letter re Improper Paper in a Reexam Proceeding has been Returned in Application 90012670; dated Oct. 30, 2013 (3 pages).
Advisory Action, List of References and Amendment After Final initialed by Examiner in Application 90012670; dated Sep. 12, 2013 (9 pages).
Reexam Response to Final Rejection, Claims and Applicant's Remarks Made in an Amendment in Application 90012670; dated Sep. 3, 2013 (6 pages).
Reexam Final Rejection and Non-Final Action in Application 90012670; dated Jul. 1, 2013 (30 pages).
Order granting Plaintiff's Motion to Defer Ruling; *ShieldMark, Inc.* v. *Creative Safety Supply, LLC*; ND Ohio ED, 1:12- cv-00221-CAB; Mar. 21, 2014 (3 pages).
Plaintif's Reply in Support of Motion to Strike Aff. of J. Poole; *ShieldMark, Inc.* v. *Creative Safety Supply, LLC*; ND Ohio ED, 1:12-cv-00221-CAB; Mar. 10, 2014 (9 pages).
Plaintiff's Reply in Support of Motion to Strike Expert Report and Dec. of T. Woods; *ShieldMark, Inc.* v. *Creative Safety Supply, LLC*; ND Ohio ED, 1:12-cv-00221-CAB; *ShieldMark, Inc.* v. *Creative Safety Supply, LLC*; ND Ohio ED, 1:12-cv-00221-CAB; Mar. 10, 2014 (10 pages).
Plaintiff's Reply in Support of Motion to Defer Ruling; *ShieldMark, Inc.* v. *Creative Safety Supply, LLC*; ND Ohio ED, 1:12-cv-00221-CAB; Mar. 10, 2014 (7 pages).
Defendant's Memorandum in Opposition to Motion to Strike Expert Report and Dec. of T. Woods; *ShieldMark, Inc.* v. *Creative Safety Supply, LLC*; ND Ohio ED, 1:12-cv-00221-CAB; Feb. 27, 2014 (42 pages).
Defendant's Memorandum in Opposition to Motion to Defer Ruling; *ShieldMark, Inc.* v. *Creative Safety Supply, LLC*; ND Ohio ED, 1:12-cv-00221-CAB; Feb. 27, 2014 (10 pages).
Plaintiff's Motion to Defer Ruling; *ShieldMark, Inc.* v. *Creative Safety Supply, LLC*; ND Ohio ED, 1:12-cv-00221-CAB; Feb. 10, 2014 (11 pages).
Plaintiff's Motion to Strike Expert Report and Dec. of T. Woods; *ShieldMark, Inc.* v. *Creative Safety Supply, LLC*; ND Ohio ED, 1:12-cv-00221-CAB; Feb. 10, 2014 (12 pages).
Plaintiff's Motion to Strike Aff. of J. Poole; *ShieldMark, Inc.* v. *Creative Safety Supply, LLC*; ND Ohio ED, 1:12-cv-00221-CAB; Feb. 10, 2014 (16 pages).
Defendant's Reply in Support of Motion for Summary Judgment, Memorandum of Law and Exhibits; *ShieldMark, Inc.* v. *Creative Safety Supply, LLC*; ND Ohio ED, 1:12-cv-00221-CAB; Jan. 23, 2014 (174 pages).
Notice of USPTO Confirmation of Patentability and Motion for Status Conference; *ShieldMark, Inc.* v. *Creative Safety Supply, LLC*; ND Ohio ED, 1:12-cv-00221-CAB; Dec. 10, 2013 (5 pages).
Plaintiff's Motion for Summary Judgment; *ShieldMark, Inc.* v. *Creative Safety Supply, LLC*; ND Ohio ED, 1:12-cv-00221-CAB; Dec. 9, 2013 (3 pages).

Plaintiff's Memorandum in Opposition to Motion for Summary Judgment and Memorandum of Law; *ShieldMark, Inc.* v. *Creative Safety Supply, LLC*; ND Ohio ED, 1:12-cv-00221-CAB; Dec. 9, 2013 (28 pages).
Defendant Creative's Notice of Second Noninfringement Contentions; *ShieldMark, Inc.* v. *Creative Safety Supply, LLC*; ND Ohio ED, 1:12-cv-00221-CAB; Aug. 1, 2013 (8 pages).
Defendant Creative's Notice of Second Supplemental Invalidity and Unenforceability Contentions; *ShieldMark, Inc.* v. *Creative Safety Supply, LLC*; ND Ohio ED, 1:12-cv-00221-CAB; Sep. 18, 2013 (26 pages).
Motion and Memorandum of Law for Summary Judgment Fraud on the Patent Office (Inequitable Conduct-Concealment of Closest Prior Art since Sep. 29, 2013); *ShieldMark, Inc.* v. *Creative Safety Supply, LLC*; ND Ohio ED, 1:12-cv-00221-CAB; Nov. 5, 2013 (20 pages).
Deposition transcript of Thomas Goecke; *ShieldMark, Inc.* v. *InSite Solutions, LLC*; ND Ohio ED, 1:12-cv-00223-DCN; Jun. 14, 2013 (247 pages).
Defendant InSite's Reply Brief in Support of its Motion for Summary Judgment; *ShieldMark, Inc.* v. *InSite Solutions, LLC*; ND Ohio ED, 1:12-cv-00223-DCN; Jun. 14, 2013 (260 pages).
Defendant InSite's Designation of Expert Disclosure (Lowe); *ShieldMark, Inc.* v. *InSite Solutions, LLC*; ND Ohio ED, 1:12-cv-00223-DCN; Jun. 20, 2013 (2 pages).
Defendant InSite's Designation of Expert Disclosure (Gaum); *ShieldMark, Inc.* v. *InSite Solutions, LLC*; ND Ohio ED, 1:12-cv-00223-DCN; Jun. 20, 2013 (21 pages).
Plaintiff ShieldMark's Motion to Strike Designation and Expert Report of Gaum; *ShieldMark, Inc.* v. *InSite Solutions, LLC*; ND Ohio ED, 1:12-cv-00223-DCN; Jul. 15, 2013 (53 pages).
Defendant InSite's Designation of Expert's Disclosure (Lowe); *ShieldMark, Inc.* v. *InSite Solutions, LLC*; ND Ohio ED, 1:12-cv-00223-DCN; Jul. 19, 2013 (5 pages).
Plaintiff ShieldMark's Initial Infringement Contentions; *ShieldMark, Inc.* v. *InSite Solutions, LLC*; ND Ohio ED, 1:12-cv-00223-DCN; Jul. 25, 2013 (6 pages).
Defendant InSite's Brief in Opposition to Motion to Strike Designation and Expert Report of Gaum; *ShieldMark, Inc.* v. *InSite Solutions, LLC*; ND Ohio ED, 1:12-cv-00223-DCN; Jul. 25, 2013 (25 pages).
Plaintiff ShieldMark's Reply Memorandum in Support of Motion to Strike; *ShieldMark, Inc.* v. *InSite Solutions, LLC*; ND Ohio ED, 1:12-cv-00223-DCN; Aug. 9, 2013 (14 pages).
Order Denying Plaintiff's Motion to Strike Gaum's Testimony; *ShieldMark, Inc.* v. *InSite Solutions, LLC*; ND Ohio ED, 1:12-cv-00223-DCN; Aug. 27, 2013 (2 pages).
Memorandum Opinion and Order; *ShieldMark, Inc.* v. *InSite Solutions, LLC*; ND Ohio ED, 1:12-cv-00223-DCN; Nov. 20, 2013 (17 pages).
Judgment Order (Motion for Summary Judgment granted in favor of defendant; case dismissed); *ShieldMark, Inc.* v. *InSite Solutions, LLC*; ND Ohio ED, 1:12-cv-00223-DCN; Nov. 20, 2013 (1 page).
Defendant InSite's Initial Non-Infringement Contentions; *ShieldMark, Inc.* v. *InSite Solutions, LLC*; ND Ohio ED, 1:13-cv-00572; Aug. 26, 2013 (3 pages).
Defendant InSite's Motion and Brief in Support of Motion for Summary Judgment; *ShieldMark, Inc.* v. *InSite Solutions, LLC*; ND Ohio ED, 1:13-cv-00572; Sep. 11, 2013 (4 pages).
Plaintiff ShieldMark's Memorandum in Opposition to Defendant's Motion for Summary Judgment; *ShieldMark, Inc.* v. *InSite Solutions, LLC*; ND Ohio ED, 1:13-cv-00572; Oct. 14, 2013 (32 pages).
Defendant InSIte's Reply to ShieldMark's Opposition to Motion for Summary Judgment; *ShieldMark, Inc.* v. *InSite Solutions, LLC*; ND Ohio ED, 1:13-cv-00572; Oct. 18, 2013 (8 pages).
Letter from R. Fischer to M. Pangrace; *ShieldMark, Inc.* v. *Creative Safety Supply, LLC*; ND Ohio ED, 1:12-cv-00221-CAB; Aug. 24, 2012 (84 pages).
Letter from W. Harders to L. Secor; *ShieldMark, Inc.* v. *Creative Safety Supply, LLC*; ND Ohio ED, 1:12-cv-00221-CAB; Sep. 14, 2012 (6 pages).
Amended Complaint for Patent Infringement, Trademark and Service Mark Infringement, Unfair Competition and Deceptive Trade

(56) References Cited

OTHER PUBLICATIONS

Practices; *ShieldMark, Inc. v. Creative Safety Supply, LLC*; ND Ohio ED, 1:12-cv-00221-CAB; Mar. 5, 2012 (17 pages).
Plaintiff's Motion for Preliminary Injunction; *ShieldMark, Inc. v. Creative Safety Supply, LLC*; ND Ohio ED, 1:12-cv-00221-CAB; Mar. 29, 2012 (44 pages).
Answer to Amended Complaint for Patent Infringement, Trademark and Service Mark Infringement, Unfair Competition and Deceptive Trade Practices and Counterclaim; *ShieldMark, Inc. v. Creative Safety Supply, LLC*; ND Ohio ED, 1:12-cv-00221-CAB; Apr. 9, 2012 (17 pages).
Defendant Creative Safety Supply, LLC's Memorandum in Opposition to Motion for Preliminary Injunction; *ShieldMark, Inc. v. Creative Safety Supply, LLC*; ND Ohio ED, 1:12-cv-00221-CAB; Apr. 17, 2012 (21 pages).
Defendant Creative Safety Supply, LLC's Memorandum in Opposition to Plaintiff's Motion to Strike and/or Exclude the Affidavit of James K. Poole; *ShieldMark, Inc. v. Creative Safety Supply, LLC*; ND Ohio ED, 1:12-cv-00221-CAB; May 11, 2012 (87 pages).
Defendant Creative Safety Supply, LLC's Memorandum in Response to Plaintiff's Motion to Dismiss and/or Strike Defendant's Counterclaim(s); *ShieldMark, Inc. v. Creative Safety Supply, LLC*; ND Ohio ED, 1:12-cv-00221-CAB; May 17, 2012 (12 pages).
Defendant Creative Safety Supply, LLC's Notice of Initial Noninfringement Contentions; *ShieldMark, Inc. v. Creative Safety Supply, LLC*; ND Ohio ED, 1:12-cv-00221-CAB; May 24, 2012 (9 pages).
Notice Regarding Amended Counterclaims to be Asserted by Defendant Creative Safety Supply, LLC; *ShieldMark, Inc. v. Creative Safety Supply, LLC*; ND Ohio ED, 1:12-cv-00221-CAB; May 24, 2012 (3 pages).
Order; *ShieldMark, Inc. v. Creative Safety Supply, LLC*; ND Ohio ED, 1:12-cv-00221-CAB; Jun. 27, 2012 (2 pages).
Motion to Amend Counterclaims and Add Third Party Defendants; *ShieldMark, Inc. v. Creative Safety Supply, LLC*; ND Ohio ED, 1:12-cv-00221-CAB; Jul. 2, 2012 (41 pages).
Defendant Creative Safety Supply, LLC's Notice of Initial Invalidity Contentions; *ShieldMark, Inc. v. Creative Safety Supply, LLC*; ND Ohio ED, 1:12-cv-00221-CAB; Jul. 13, 2012 (25 pages).
Non-Party Proposed Third Party Defendants W. Scott Harders, Esq. and Brennan, Manna & Diamond, LLC's Oppositions to Defendant's Motion to Amend Counterclaims and Add Third Party Defendants; *ShieldMark, Inc. v. Creative Safety Supply, LLC*; ND Ohio ED, 1:12-cv-00221-CAB; Jul. 30, 2012 (5 pages).
Plaintiff's Memorandum in Opposition to Motion to Amend Counterclaim; *ShieldMark, Inc. v. Creative Safety Supply, LLC*; ND Ohio ED, 1:12-cv-00221-CAB; Jul. 30, 2012 (6 pages).
Defendant Creative Safety Supply, LLC's Memorandum in Reply Supporting Motion to Amend Counterclaims and Add Third Parties; *ShieldMark, Inc. v. Creative Safety Supply, LLC*; ND Ohio ED, 1:12-cv-00221-CAB; Aug. 9, 2012 (7 pages).
Defendant Creative Safety Supply, LLC's Memorandum in Reply Supporting Motion to Amend Counterclaims and Add Third Parties; *ShieldMark, Inc. v. Creative Safety Supply, LC*; ND Ohio ED, 1:12-cv-00221-CAB; Aug. 10, 2012 (9 pages).
Plaintiff's Validity and Enforceability Contentions Pursuant to Local Patent Rule 3.7; *ShieldMark, Inc. v. Creative Safety Supply, LLC*; ND Ohio ED, 1:12-cv-00221-CAB; Aug. 24, 2012 (17 pages).
Defendant's Claim Chart of Invalidity and Unenforceability; *ShieldMark, Inc. v. Creative Safety Supply, LLC*; ND Ohio ED, 1:12-cv-00221-CAB; Sep. 7, 2012 (15 pages).
Complaint for Patent Infringement; *ShieldMark, Inc. v. Ergomat, LLC*; ND Ohio ED, 1:12-cv-00219-DAP; Jan. 30, 2012 (4 pages).
Plaintiff's Motion for Default Judgment and Permanent Injunction; *ShieldMark, Inc. v. Ergomat, LLC*; ND Ohio ED, 1:12-cv-00219-DAP; Jun. 22, 2012 (26 pages).
Judgment Entry; *ShieldMark, Inc. v. Ergomat, LLC*; ND Ohio ED, 1:12-cv-00219-DAP; Jul. 12, 2012 (3 pages).
Unopposed Motion to Vacate Default Judgment and to Dissolve Permanent Injunction; *ShieldMark, Inc. v. Ergomat, LLC*; ND Ohio ED, 1:12-cv-00219-DAP; Jul. 30, 2012 (3 pages).

Amended Complaint for Patent Infringement; *ShieldMark, Inc. v. InSite Solutions, LLC*; ND Ohio ED, 1:12-cv-00223-DCN; Mar. 5, 2012 (10 pages).
Plaintiff's Motion for Preliminary Injunction; *ShieldMark, Inc. v. InSite Solutions, LLC*; ND Ohio ED, 1:12-cv-00223-DCN; Apr. 2, 2012 (36 pages).
Answer, Affirmative Defenses and Counterclaims in Response to Amended Complaint; *ShieldMark, Inc. v. InSite Solutions, LLC*; ND Ohio ED, 1:12-cv-00223-DCN; May 25, 2012 (8 pages).
Motion to Dismiss Complaint and Supporting Memorandum of Points and Authorities; *ShieldMark, Inc. v. InSite Solutions, LLC*; ND Ohio ED, 1:12-cv-00223-DCN; Apr. 13, 2012 (9 pages).
Defendant's Motion to Stay Preliminary Injunction Proceedings; *ShieldMark, Inc. v. InSite Solutions, LLC*; ND Ohio ED, 1:12-cv-00223-DCN; Apr. 16, 2012 (3 pages).
Plaintiff's Memorandum in Opposition to Defendant's Motion to Dismiss Complaint; *ShieldMark, Inc. v. InSite Solutions, LLC*; ND Ohio ED, 1:12-cv-00223-DCN; Apr. 24, 2012 (6 pages).
Plaintiff's Memorandum in Opposition to Defendant's Motion to Stay Preliminary Injunction Proceedings; *ShieldMark, Inc. v. InSite Solutions, LLC*; ND Ohio ED, 1:12-cv-00223-DCN; Apr. 24, 2012 (2 pages).
Plaintiff's Initial Infringement Contentions Pursuant to Local Patent Rules 3.1 and 3.2; *ShieldMark, Inc. v. InSite Solutions, LLC*; ND Ohio ED, 1:12-cv-00223-DCN; Apr. 27, 2012 (8 pages).
Defendant's Reply to Plaintiffs Memorandum in Opposition to Defendant's Motion to Stay Preliminary Injunction Proceedings; *ShieldMark, Inc. v. InSite Solutions, LLC*; ND Ohio ED, 1:12-cv-00223-DCN; May 3, 2012 (3 pages).
Defendant's Reply to Plaintiffs Memorandum in Opposition to Defendant's Motion to Dismiss Complaint; *ShieldMark, Inc. v. InSite Solutions, LLC*; ND Ohio ED, 1:12-cv-00223-DCN; May 3, 2012 (5 pages).
Memorandum Opinion and Order; *ShieldMark, Inc. v. InSite Solutions, LLC*; ND Ohio ED, 1:12-cv-00223-DCN; May 18, 2012 (4 pages).
Defendant's Initial Noninfringement Contentions Pursuant to Local Patent Rules 3.3 and 3.4; *ShieldMark, Inc. v. InSite Solutions, LLC*; ND Ohio ED, 1:12-cv-00223-DCN; May 25, 2012 (6 pages).
Reply to Counterclaim; *ShieldMark, Inc. v. InSite Solutions, LLC*; ND Ohio ED, 1:12-cv-00223-DCN; Jun. 15, 2012 (6 pages).
Invalidity and Unenforceability Contentions of InSite Solutions, LLC Under L.P.R. 3.5 (a-c); *ShieldMark, Inc. v. InSite Solutions, LLC*; ND Ohio ED, 1:12-cv-00223-DCN; Jun. 15, 2012 (213 pages).
Invalidity and Unenforceability Contentions of InSite Solutions, LLC Under L.P.R. 3.5(d) and 3.6; *ShieldMark, Inc. v. InSite Solutions, LLC*; ND Ohio ED, 1:12-cv-00223-DCN; Jun. 15, 2012 (3 pages).
Defendant's Proposed Claim Terms Requiring Construction; *ShieldMark, Inc. v. InSite Solutions, LLC*; ND Ohio ED, 1:12-cv-00223-DCN; Jul. 17, 2012 (3 pages).
Plaintiff's Validity and Enforceability Contentions Pursuant to Local Patent Rule 3.7; *ShieldMark, Inc. v. InSite Solutions, LLC*; ND Ohio ED, 1:12-cv-00223-DCN; Jul. 23, 2012 (32 pages).
Defendant's Motion for Summary Judgment of Patent Invalidity; *ShieldMark, Inc. v. InSite Solutions, LLC*; ND Ohio ED, 1:12-cv-00223-DCN; Aug. 14, 2012 (2 pages).
Brief in Support of Defendant's Motion for Summary Judgment; *ShieldMark, Inc. v. InSite Solutions, LLC*; ND Ohio ED, 1:12-cv-00223-DCN; Aug. 14, 2012 (47 pages).
Defendant's Opposition to Plaintiff's Motion for Preliminary Injunction; *ShieldMark, Inc. v. InSite Solutions, LLC*; ND Ohio ED, 1:12-cv-00223-DCN; Aug. 14, 2012 (16 pages).
ShieldMark, Inc.'s Motion to Strike the Affidavit of a Sales Manager Named Hendrikus Gerrits Pursuant to Rule 56(c) (4); *ShieldMark, Inc. v. InSite Solutions, LLC*; ND Ohio ED, 1:12-cv-00223-DCN; Sep. 14, 2012 (8 pages).
Reply Brief in Support of Plaintiff's Request for Preliminary Injunction; *ShieldMark, Inc. v. InSite Solutions, LLC*; ND Ohio ED, 1:12-cv-00223-DCN; Sep. 14, 2012 (8 pages).

(56) References Cited

OTHER PUBLICATIONS

Plaintiff's Memorandum in Opposition to Defendant's Motion for Summary Judgment; *ShieldMark, Inc.* v. *InSite Solutions, LLC*; ND Ohio ED, 1:12-cv-00223-DCN; Sep. 14, 2012 (86 pages).
High Quality Tapes and Labels, Windmill Tapes—Industrial PVC Tapes, http://www.windmilltapes.com/pvc.html, Product Data Sheet; Aug. 16, 2004 (1 page).
Merriam-Webster's Collegiate Dictionary, 1996, Merriam-Webster, Incorporated, Tenth Edition, pp. 335 and 1205 (4 pages).
Handbook of Pressure Sensitive Adhesive Technology, 3d Edition, Satas & Associates, 1999, Chapter 5—Peel Adhesion, p. 79 (1 page).
Plaintiff's Opposition to Renewed Motion for Summary Judgment; *ShieldMark* v. *Creative Safety Supply, LLC*; ND Ohio ED, 1:12-cv-00221-CAB; Aug. 12, 2015 (72 pages).
Defendant's Renewed Motion for Summary Judgment; *ShieldMark* v. *Creative Safety Supply, LLC*; ND Ohio ED, 1:12-cv-00221-CAB; Jun. 29, 2015 (40 pages).
Protest Under 37 CFR 1.291 filed in related U.S. Appl. No. 13/731,637, filed Jun. 18, 2015 (73 pages).
Final Office Action in related U.S. Appl. No. 13/731,637; dated May 21, 2015 (52 pages).
Non-final Office Action in related U.S. Appl. No. 13/731,637; dated Sep. 11, 2014 (83 pages).
Blue Realm Studios, Understanding Shore Hardness, Feb. 25, 2009, www.bluerealmstudios.com.
Weber, Ray, Deposition of Thomas R. Goecke, Apr. 25, 2013, in *Shieldmark, Inc.* vs. *Insite Solutions*, Ohio Northern District Court, Case No. 1-12-CV-00223 Doc. No. 76 attachment No. 1.
Motion and Memorandum of Law for Summary Judgement, Apr. 8, 2013, in *Shieldmark, Inc.* vs. *Creative Safety Supply, LLC*, Ohio Northern District Court, Case No. 1:12-CV-00221-CAB.
Daubert et al., U.S. Pat. No. 3,386,527, Aug. 5, 1965.
Blumel et al., U.S. Pat. No. 4,148,780, Apr. 16, 1979.
Advance Traffic Markings, ATM 300 Permanent Marking Tape Description and Specification, 2002, Advance Traffic Markings, Path Rubber Company, a division of Myers Industries, Inc.
Amos, Tacky Floor Pad, U.S. Pat. No. 3,785,102, Jan. 15, 1974.
Pressure Sensitive Tape Counsil (North America), www.ptsc.org, Harmonized International Standards PSTC-101, "Peel Adhesion of Pressure Sensitive Tape", 2000.
Swarco Industries, Swarco Industries Director 60 Pavement Marking Tape Information and Specification Sheet, Jan. 10, 1998.
Eigenmann, Method and Devices for Road Surface marking, U.S. Pat. No. 4,012,247, granted Mar. 15, 1977.
3M, Floor Marking Application Ideas; Apr. 2003.

\* cited by examiner

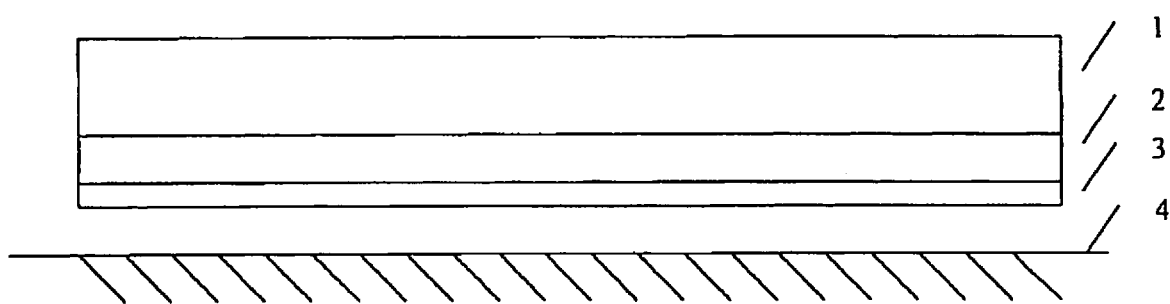

ADHESIVE TAPE PRODUCTS AND METHODS OF MAKING

RELATED APPLICATIONS

This application is a continuation of and claims priority to application Ser. No. 13/342,528 filed Jan. 3, 2012, pending, which in turn claims priority to application Ser. No. 10/674,108 filed Sep. 29, 2003, now issued as U.S. Pat. No. 8,088,480.

BACKGROUND

This invention relates to an adhesive tape having superior ductility, strength, tear resistance and abrasion resistance, particularly a pressure sensitive adhesive. Polymeric pressure sensitive adhesive tapes are economical and adaptable to many different applications. One primary example is as floor marking in industrial and factory environments. However, there are several disadvantages to using such tape in industrial settings. One disadvantage is that the tape lacks sufficient strength and hardness to prevent wearing, tearing, cracking and breakage from heavy and repeated traffic, such as from forklift trucks. Similarly, as a result of poor adhesive quality, repeated traffic has a tendency to detach many commercially available tapes from the floor. Another disadvantage is that the aesthetic qualities and physical properties of the tape are diminished from scuffing, scratching, and the like. Such disadvantages plague existing polymeric pressure sensitive adhesive tapes. Because of these disadvantages that have been associated with polymeric pressure sensitive adhesive tape, wide industry acceptance has been historically difficult to achieve. Accordingly, many opt to rely on the time consuming and exacting practice of painting.

In view of the above discussion, it is an advantage of the present invention to provide a polymeric adhesive tape that has superior ductility, strength, tear resistance and abrasion resistance. Other advantages of the present invention will be apparent from the following detailed description.

SUMMARY OF INVENTION

According to one embodiment, an adhesive tape is provided. The tape has a first layer of polymeric material having a Shore A Hardness of between 92 and 100 and a thickness of between 0.020" and 0.065", and a second layer of adhesive. Preferably, the adhesive is of a pressure sensitive type.

BRIEF DESCRIPTION OF THE DRAWINGS

FIG. 1 is a cross-sectional view illustrating the embodiment of a polymeric pressure sensitive adhesive tape.

DETAILED DESCRIPTION OF THE INVENTION

The adhesive tape of this invention usually comprises a layer of polymeric material and at least one layer of adhesive material. The pressure-sensitive adhesive tape of this invention is not limited to having only the above layers of polymeric material and layer of pressure-sensitive adhesive material. It may optionally have an additional layer, such as a laminating substrate on an outermost side of the above adhesive layer. The laminating substrate is usually peeled off and thrown away when pressure-sensitive adhesive tape is actually used. Therefore, inexpensive materials are preferred, however, there are no particular limitations on the materials used for the laminating substrate.

FIG. 1 is an example of the pressure-sensitive adhesive tape of this invention wherein a layer of polymeric material (1) is attached to the top side of a layer of pressure-sensitive adhesive material (2) and a laminating substrate (3) is attached to the bottom side of the pressure-sensitive adhesive material. Upon removal of the laminating substrate (1), the tape can be applied to a floor (4) with the application of pressure.

The pressure-sensitive adhesive tape of this invention can be produced in a variety of lengths, widths, and thickness. A variety of colors can also be used for the outer surface of the layer of polymeric material (1). For example, safety yellow can be used for aisle markings, or red can be used for quarantine and reject markings in a production facility. Coloring can be achieved by introducing a colorant in any form, including pigments and dyes into the polymeric material.

The adhesive employed in layer material (3) may be any of those heretofore employed in the art for preparing adhesive structures. By way of illustration, suitable adhesives of this general description include those disclosed in U.S. Pat. No. 5,061,559, herein incorporated by reference.

The layer of polymeric material (1) may be a durable polymer such as polyvinyl chloride, polycarbonate, or a terpolymer comprised of acrylonitrile, butadiene and styrene or the like. A clear or tinted polyvinyl chloride is a preferred material. The polymer selected must have Shore A Hardness between, for example, 92-100, and preferably between 93-97. The outer surface of the layer of polymeric material (1) is preferably textured. The layer of polymeric material (1) may have a thickness of about, for example, 0.020" to 0.065".

Advantageously, this embodiment of the invention provides improved tear resistance, strength, and abrasion resistance by employing the sum or all of the combination of polymer selected, Shore A Hardness, textured surface, and layer thickness.

Examples

One embodiment of the invention will be described below in greater detail through the following examples.

Test samples were performed on a 4" wide sample of the pressure sensitive adhesive tape of this invention. The example tape was constructed of a semi-rigid 95A polyvinyl chloride from Artemis Industries, 2550 Gilcrest Rd, Akron Ohio 44305 which was extruded from a 2& ½" diameter NRM extrusion machine at 360-380° F. at an extrusion rate of 400 ft per hour to yield a 0.065 thick, 4" wide layer. A textured first surface of the extruded polymer layer was achieved by following the above process parameters. During extrusion a rubberized double sided carpet tape (Product #591B) from International Tape Co., P.O. Box 240, 6 Industrial Drive, Windham, N.H. 03087 was applied to a second side of the extruded polymer layer. A tape from Windmill Tapes of Great Britain (www.windmilltapes.com) was used for comparison purposes. Test samples were conditioned at 73±3° F. and 50±5% relative humidity for at least 24 hours prior to testing.

Tensile strength at yield point was determined according to ASTM D 882 testing method. A 0.5"×8" sample was prepared and placed in the jaws of the instrument at a separation of 4.0". The tester was started at a separation rate of 2.0 in/min. At the instance the tape yielded the force was recorded. Five replicates of each sample were conducted and the results were normalized to pounds per inch width. Results indicate higher yield point and higher absolute forces involved at yield point for the pressure sensitive adhesive tape of this invention. Particularly, the yield point in both machine and traverse direction were respectively, on average, 3,176 lb/in² and 3,136 lb/in².

Tear resistance was determined according to the ASTM D 1004 test method. The samples were die cut according to the method. The liner from the sample was removed and the sample was placed in the jaws of the tester at a separation of one inch. The tester was started at a rate of 2.0 in/min. The maximum force encountered during testing was recorded. Five replicates of each sample in both the machine and traverse direction were tested. Results indicate substantially improved tear strength in both the machine and traverse directions for the pressure sensitive adhesive tape of this invention. Particularly, the tear strength in both machine and traverse direction was respectively, on average, 22.3 lb and 22.1 lb.

Caliper or thickness was determined according to the PSTC-33 method. Caliper of the material was determined both with and without the liner. Ten replicates of each sample were measured. Results indicate substantially increased thickness of the pressure sensitive adhesive tape of this invention, partly because of the inherent characteristics of the semi-rigid surface. Particularly, the thickness of the material, with and without the liner, was respectively, on average, 68.4 mil and 65.4 mil.

Peel adhesion was tested according to a modified PSTC-101D method. The modification included dwell time. Peel adhesion is a measure of the strength of the adhesive bond between the tape and the test surface. Exactly one (1.0) inch wide samples were applied to a standard stainless steel test panel at a rate of 24 in/min with a 4.5 pound rubber covered roller according to the method. The tape was then peeled from the substrate at a 90° angle after a dwell time of one hour. The force required for removal was measured. Five replicates of each sample were tested. Results indicate substantially increased peel adhesion for the pressure sensitive adhesive tape of this invention when applied to stainless steel. Particularly, the peel adhesion of this material was, on average, 5.2 lb/in width.

Abrasion resistance was determined according to a modified ASTM D 5264 test method. The material was cut to a 2.5"×6" size. A new 2"×4" piece of standard A-5 receptor material (moderate abrasive) from Gavarti Associates Ltd. was affixed with double-sided tape to the four pound instrument weight (0.5 lb/in2 load). This in turn was placed over the test sample. The instrument was set for 100 strokes and operation was initiated. The instrument strikes an arc with the abrasive over the test material. Each stroke consists of one motion back and forth over the sample. When the cycles were completed the weighted abrasive was lifted and the test sample removed. At the conclusion of the test the overall quality of each sample was evaluated relatively for scratch resistance. Results indicate that the abrasion resistance of the pressure sensitive adhesive tape of this invention is improved over the comparative tape.

Results obtained were as follows:

|  | Average | σ standard deviation) | N (test numbers) |
|---|---|---|---|
| Tensile at Yield at 2.0 in/min, lb/in² | | | |
| Inventive Sample Machine Direction | 3.176 | 152 | 5 |
| Inventive Sample Traverse Direction | 3.136 | 56 | 5 |
| Comparative Sample Machine Direction | 2.400 | 160 | 5 |
| Comparative Sample Transverse Direction | 1.720 | 120 | 5 |
| Tear at 2.0 in/min, lb. | | | |
| Inventive Sample Machine Direction | 22.3 | 1.6 | 5 |
| Inventive Sample Traverse Direction | 22.1 | 0.4 | 5 |
| Comparative Sample Machine Direction | 2.2 | 0.1 | 5 |
| Comparative Sample Transverse Direction | 1.6 | 0.1 | 5 |
| Caliper, mil. | | | |
| Inventive Sample With Liner | 68.4 | 0.5 | 10 |
| Inventive Sample Without Liner | 65.4 | 0.5 | 10 |
| Comparative Sample | 5.5 | 0.04 | 10 |
| Adhesion to Stainless lb/in width | | | |
| Inventive Sample | 5.2 | 0.5 | 5 |
| Comparative Sample | 1.7 | 0.03 | 5 |
| Abrasion Resistance | | | |
| Inventive Sample | Excellent-no sign of damage | | |
| Comparative Sample | Fair-moderate damage | | |

Since certain changes may be made without departing from the scope of the invention herein involved, it is intended that all matter described in the foregoing description, including the examples, shall be interpreted as illustrative and not in a limiting sense.

What is claimed is:

1. A roll of an adhesive tape aisle marking system comprising:
   a layer of polyvinyl chloride having a Shore A Hardness between 92 and 100 and a thickness between 20 mil and 65 mil;
   a layer of adhesive physically contacting the layer of polyvinyl chloride, where the layer of adhesive has a thickness less than the thickness of the polymer layer; and
   a laminating substrate contacting the layer of adhesive,
   where the adhesive tape aisle marking system comprises a peel adhesion greater than 2.0 pounds per inch width when the laminating substrate is removed and a sample of the adhesive tape aisle marking system is adhered, the peel adhesion measured under a test method including peeling the sample of the adhesive tape aisle marking system at a 90 degree angle after application to a stainless steel panel.

2. The roll of an adhesive tape aisle marking system as set forth in claim 1, where the test method further includes peeling the sample of the adhesive tape aisle marking system at a 90 degree angle after application to a stainless steel panel and allowing a dwell of one hour.

3. The roll of an adhesive tape aisle marking system as set forth in claim 1, where the test method further includes peeling the sample of the adhesive tape aisle marking system according to a modified PSTC-101 test method where the modified PSTC-101 test method comprises a dwell time of one hour.

4. The roll of an adhesive tape aisle marking system as set forth in claim 1, where the sample of the adhesive tape aisle marking system comprises a 0.5 inch by 8.0 inch sample and the sample comprises a tensile strength at yield in the machine direction of greater than 3000 pounds per inch squared.

5. The roll of an adhesive tape aisle marking system as set forth in claim 1, where the sample of the adhesive tape aisle marking system comprises a 0.5 inch by 8.0 inch sample and the sample comprises a tensile strength at yield in a machine direction greater than 3000 pounds per inch squared where the tensile strength is measured according to a ASTM D 882 test method.

6. The roll of an adhesive tape aisle marking system as set forth in claim 1, where the sample of the adhesive tape aisle marking system comprises a 0.5 inch by 8.0 inch sample and the sample comprises a tensile strength at yield in both a machine direction and a traverse direction greater than 3000 pounds per inch squared.

7. The roll of an adhesive tape aisle marking system as set forth in claim 1, where the sample of the adhesive tape aisle marking system comprises a 0.5 inch by 8.0 inch sample and the sample comprises a tensile strength at yield in both a machine direction and a traverse direction greater than 3000 pounds per inch squared where the tensile strength is measured according to a ASTM D 882 test method.

8. The roll of an adhesive tape aisle marking system as set forth in claim 1, where the adhesive tape aisle marking system comprises a peel adhesion at least 5.2 pounds per inch width when the laminating substrate is removed and a sample of the adhesive tape aisle marking system is adhered, the peel adhesion measured under a test method including peeling the tape at a 90 degree angle after application to a stainless steel panel.

9. The roll of an adhesive tape aisle marking system as set forth in claim 1, where the adhesive tape aisle marking system comprises a peel adhesion between 4.7 and 5.7 pounds per inch width when the laminating substrate is removed and a sample of the adhesive tape aisle marking system is adhered, the peel adhesion measured under a modified PSTC-101 test method where the modified PSTC-101 test method comprises a dwell time of one hour.

10. The roll of an adhesive tape aisle marking system as set forth in claim 1, where the layer of adhesive physically contacting the polymer layer comprises a pressure sensitive adhesive layer.

11. The roll of an adhesive tape aisle marking system as set forth in claim 1, where the sample of the adhesive tape aisle marking system comprises a tear strength in a machine direction greater than 20 pounds.

12. The roll of an adhesive tape aisle marking system as set forth in claim 1, where the sample of the adhesive tape aisle marking system comprises a tear strength in both a machine direction and a traverse direction greater than 20 pounds.

13. The roll of an adhesive tape aisle marking system as set forth in claim 1, where the sample of the adhesive tape aisle marking system comprises a tear strength in a machine direction greater than 20 pounds, where the tear strength is measured according to a ASTM D 1004 test method at a rate of 2.0 inches per minute.

14. The roll of an adhesive tape aisle marking system as set forth in claim 1, where the sample of the adhesive tape aisle marking system comprises a tear strength in both a machine direction and a traverse direction greater than 20 pounds, where the tear strength is measured according to a ASTM D 1004 test method at a rate of 2.0 inches per minute.

15. The roll of an adhesive tape aisle marking system as set forth in claim 1, where the sample of the adhesive tape aisle marking system comprises a 2.5 inch by 6.0 inch sample, the sample having an excellent abrasion resistance after one hundred strokes according to ASTM D 5264 test method.

16. The roll of an adhesive tape aisle marking system as set forth in claim 1, where the thickness of the sample of the adhesive tape aisle marking system is determined according to the PSTC-33 method.

17. An aisle marking system comprising:
   a polymer having a Shore A Hardness between 92 and 100 and a thickness between 20 mil and 65 mil;
   an adhesive contacting the polymer, where the adhesive has a thickness less than the thickness of the polymer; and
   a laminating substrate contacting the adhesive,
   where the aisle marking system comprises a peel adhesion greater than 2.0 pounds per inch width when the laminating substrate is removed, where the peel adhesion is measured under a test including adhering a sample of the aisle marking system to a stainless steel panel and peeling the sample at a 90 degree angle.

18. The aisle marking system as set forth in claim 17, where the test further includes peeling the sample of the aisle marking system according to a modified PSTC-101 test where the modified PSTC-101 test comprises a dwell time of one hour.

19. The aisle marking system as set forth in claim 17, where the aisle marking system comprises a peel adhesion at least 5.0 pounds per inch width.

20. The aisle marking system as set forth in claim 17, where the thickness of the polymer is determined according to the PSTC-33 test.

* * * * *